United States Patent [19]

Bhongbhibhat et al.

[11] 4,249,099
[45] Feb. 3, 1981

[54] DYNAMOELECTRIC MACHINE WITH REDUCED ARMATURE REACTION

[75] Inventors: Wisnu Bhongbhibhat; Andreas Boehringer, both of Stuttgart; Hans-Dieter Schmid, Tamm-Hohenstange; Siegfried Haussmann, Steinenbergstrasse 11, 7400 Nürtingen, all of Fed. Rep. of Germany; Ivan Ilic, Zagreb, Yugoslavia

[73] Assignee: Siegfried Haussmann, Nürtingen, Fed. Rep. of Germany

[21] Appl. No.: 949,211

[22] Filed: Oct. 6, 1978

[30] Foreign Application Priority Data

Oct. 10, 1977 [DE] Fed. Rep. of Germany ....... 2745516
Jul. 7, 1978 [DE] Fed. Rep. of Germany ....... 2833168

[51] Int. Cl.³ ............................................. H01J 17/04
[52] U.S. Cl. ..................................... 310/218; 310/42; 310/43; 310/217; 310/256; 310/259; 310/265
[58] Field of Search .................... 310/42, 43, 186–188, 310/216–218, 224, 254, 258, 259

[56] References Cited

U.S. PATENT DOCUMENTS

| | | | |
|---|---|---|---|
| 2,236,291 | 3/1941 | Kilbourne | 310/218 |
| 3,254,372 | 6/1966 | Hofbauer | 310/217 X |
| 3,441,760 | 4/1969 | Collens | 310/218 X |
| 3,533,867 | 10/1970 | Derzee | 310/217 X |
| 3,591,819 | 7/1971 | Laing | 310/217 |
| 3,921,017 | 11/1975 | Hallerbäck | 310/43 X |
| 3,953,754 | 4/1976 | Hallerbäck | 310/43 X |
| 3,983,434 | 9/1976 | Sims | 310/217 X |
| 4,041,338 | 8/1977 | Madsen et al. | 310/186 |
| 4,048,527 | 9/1977 | Hallerbäck | 310/43 |
| 4,103,195 | 7/1978 | Torossian | 310/217 X |

Primary Examiner—Mark O. Budd
Attorney, Agent, or Firm—Frishauf, Holtz, Goodman & Woodward

[57] ABSTRACT

Armature reaction in a dynamo is reduced by constructing the main pole structure and/or the commutating pole structure with a plurality of iron lamina arranged parallel to the axis of rotation of the dynamo. The iron lamina are separated from each other by nonmagnetic or magnetically weak material of a predetermined thickness designed to cause a predetermined minimum but high reluctance to be offered to flux generated in the main or commutating pole structure as a result of armature current. The core of each pole may be split into a first and second core half at the root and in the direction of the axis of rotation. Each core half has a larger portion which extends to the adjacent core half of the neighboring pole, thereby forming a yoke. A smaller portion of each core half extends into the air gap between poles and, together with the corresponding portion of the core half of the neighboring pole which is similarly extended into the same air gap, forms a commutating pole. Each iron lamina may be constructed of a plurality of sublaminas which are glued together.

26 Claims, 9 Drawing Figures

DYNAMOELECTRIC MACHINE WITH REDUCED ARMATURE REACTION

The present invention relates to dynamos and, more particularly, to a construction of dynamos which decreases the armature reaction.

BACKGROUND AND PRIOR ART

Armature reaction is a basic problem both for dynamos using commutators (that is D.C. or single phase A.C. machines) and in synchronous motors and generators. The flux resulting from the armature electromotive force causes a distortion and, because of saturation effects, a weakening of the exciter field. The latter in turn causes a loss of voltage in the armature circuit, that is a decrease in the output of the machine. It is, therefore, highly desirable to keep the armature reaction within reasonable bounds. For this reason, many conventional machines are built with an air gap between the main pole and the armature which is substantially larger than would be required from the purely mechanical point of view. However, under these conditions, a greater exciting current is required, which in turn causes an increase in the size of the machine. This of course also increases its cost.

THE INVENTION

It is an object of the present invention to provide a dynamo construction which decreases armature reaction.

In a dynamo, the rotor rotates about an axis of rotation. In accordance with the invention, the exciter structure which carries the field winding comprises a plurality of iron lamina arranged parallel to the axis of rotation and separated from each other by nonmagnetic or magnetically weak material resulting in a composite structure, so that the magnetic flux generated in the exciter structure as a result of the armature current encounters a high reluctance. The increased reluctance of the magnetic is obtained by making the non, or weakly magnetic material of the same order of thickness as the iron lamina, but not thicker than the iron lamina.

BRIEF DESCRIPTION OF THE DRAWING

FIG. 4, lower half, shows the variation of air gap induction for the arrangement of the upper half;

In FIG. 1 the individual iron lamina are denoted by reference numeral 1. The iron lamina 1 are separated by magnetically nonconductive or weakly conductive material 5 which are somewhat thinner than the lamina but of the same order of thickness, and, together with this material, constitute composite poles 2 and composite yokes 3 of the exciter or field structure. The field winding is denoted by reference numeral 4. The lamina are arranged parallel to the axis of rotation. With this construction, and due to the pressure of a substantial preparation of nonmagnetic material, the flux created in the field structure as a result of the magnetomotive force in the armature encounters a high reluctance.

Figure 1:
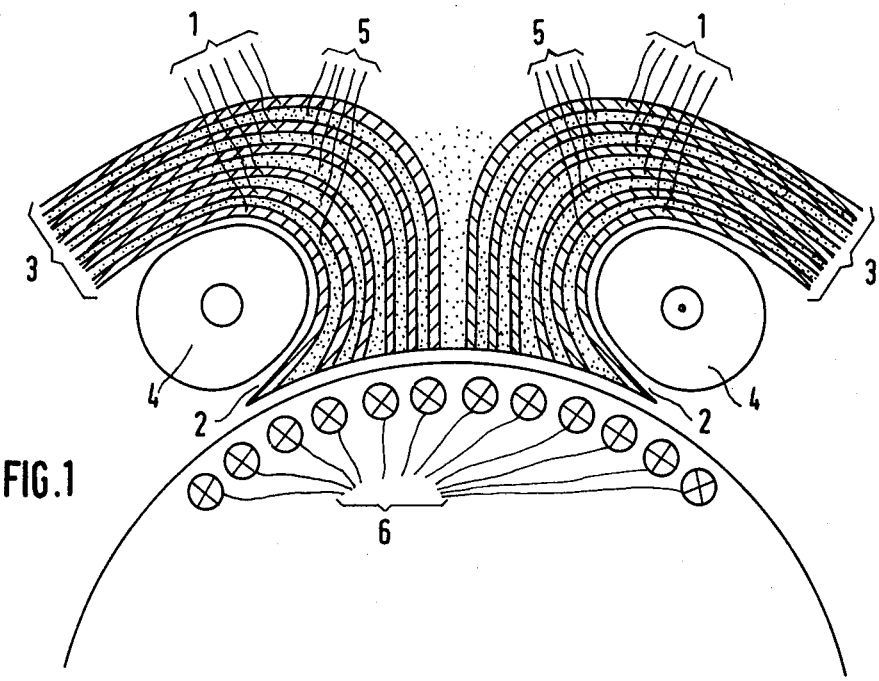
FIG. 1 is a schematic diagram showing the exciter (field) structure associated with one pole of a dynamo.
Figure 2:
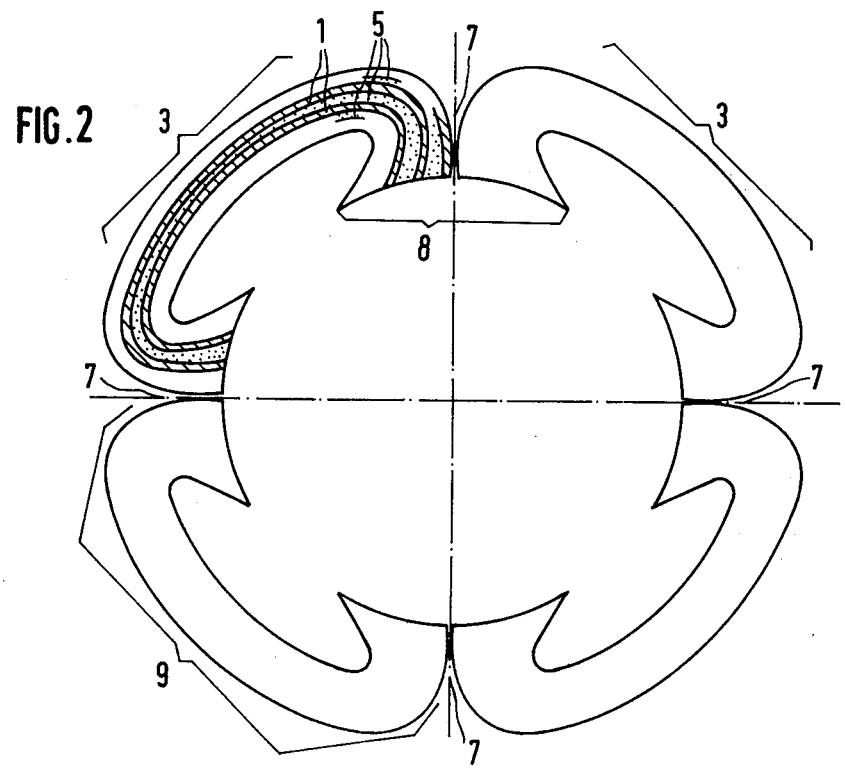
FIG. 2 is a schematic diagram showing the exciter (field) structure of a four pole dynamo.
Figure 3:
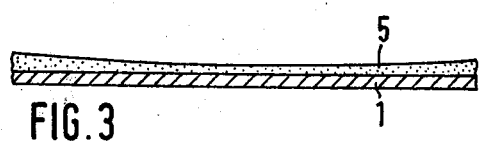
FIG. 3 shows a single iron lamina and associated nonmagnetic material.

In order to form a magnetic return path, the iron core of each pole constructed in accordance with the present invention is split into two halves at the core root 7 in the direction of the axis of rotation. Each half extends to form a single yoke 3 with an adjacent half of a neighboring pole. If necessary, the iron lamina 1 at the pole shoe 8 are expanded corresponding to the arc to be covered by the pole and are maintained in this position. It should be noted that the term "iron lamina" includes material which have a magnetic preferred direction in the direction of the field lines of the exciter flux. Further, the iron lamina 1 as shown in FIG. 3, may already be covered with nonmagnetic or only slightly magnetic material 5 of the requisite thickness during manufacture so that it is only necessary to stack them in accordance with the present invention, paste them together, and form them to constitute a segment 9 for example as shown in FIG. 2.

Figure 4:
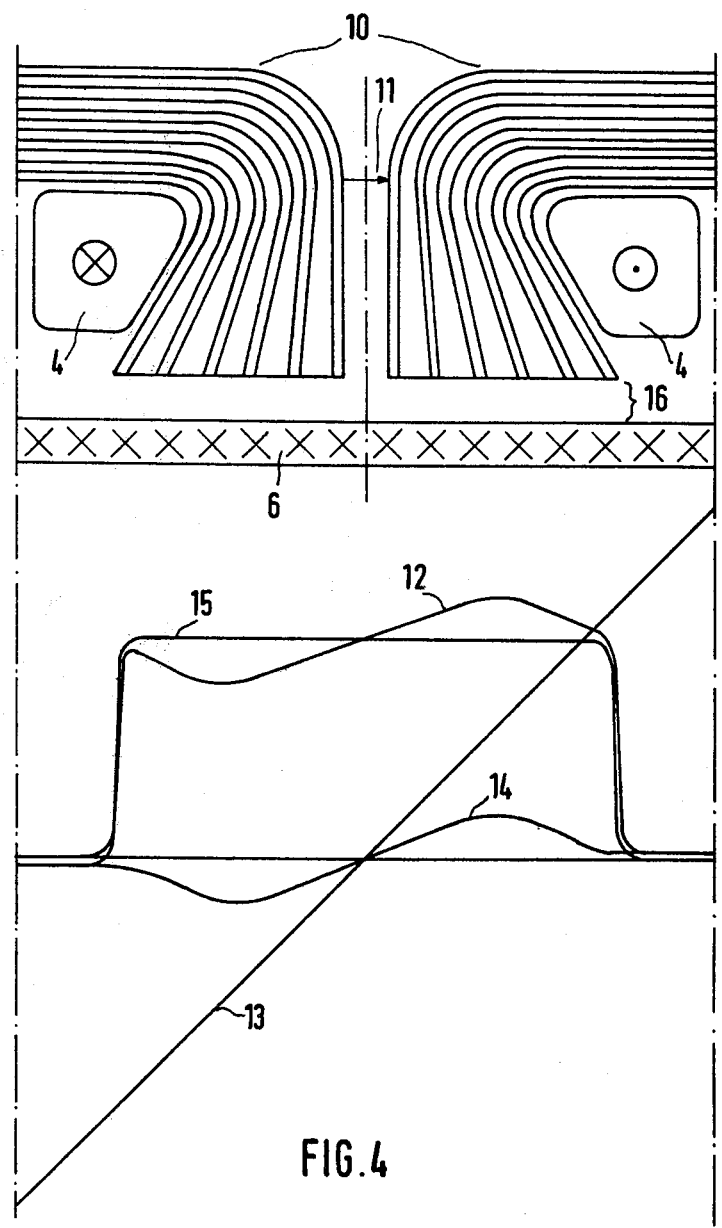
FIG. 4, upper half, shows two halves of an iron core separated from each other in accordance with the present invention.

An additional possibility for decreasing armature reaction is to create a space 11 between the two core halves 10 of each main pole, as shown in FIG. 4. Specifically, the width of space 11 is to exceed the spacing between the iron lamina in this region. Further, the space between the two iron core halves of each main pole is to be kept empty or filled with nonmagnetic or magnetically weak material.

The typical variation of induction in air gap 16 of a main pole constructed as described above is shown in the lower half of FIG. 4. Curve 13 shows the field excitation curve curve 15 of the induction or magnetomotive force due to the field, curve 14 shows the induction in air gap 16 resulting from the current in armature 6 and curve 12 shows the overall variation of induction in air gap 16, both as a function of field current due to armature current and current through the field winding 4.

Figure 5:
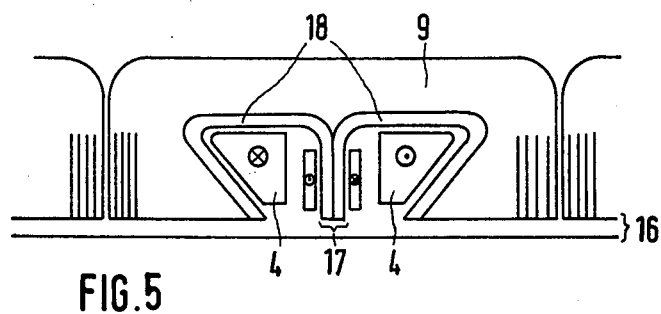
FIG. 5 is a schematic diagram showing a field structure with commutating poles.

Commutating poles can be provided in machines constructed in accordance with the present invention. A preferred embodiment is shown in FIG. 5. Here the commutating pole 17 comprises two partial segments 18 which are located between the main pole segments and inside the pole shoes thereof. The return path for the commutative flux is no longer through the core root of the neighboring main pole as is the case in conventional dynamos, but takes place through the air gap between the armature and that end of the commutating pole segment which adjoins the respective main pole. The commutating pole segments may be constructed in the same way as are the main pole segments, although the distance between adjacent iron lamina in the commutating pole segments may be less than that in the main pole, or may even be zero. The commutating pole segments can be constructed of solid material and, if desired, the two segments of each commutating pole may be joined to form a single unit. For the latter, it is also possible to make the transition to a laminated structure which is laminated in a direction perpendicular to the axis of rotation.

Figure 6:
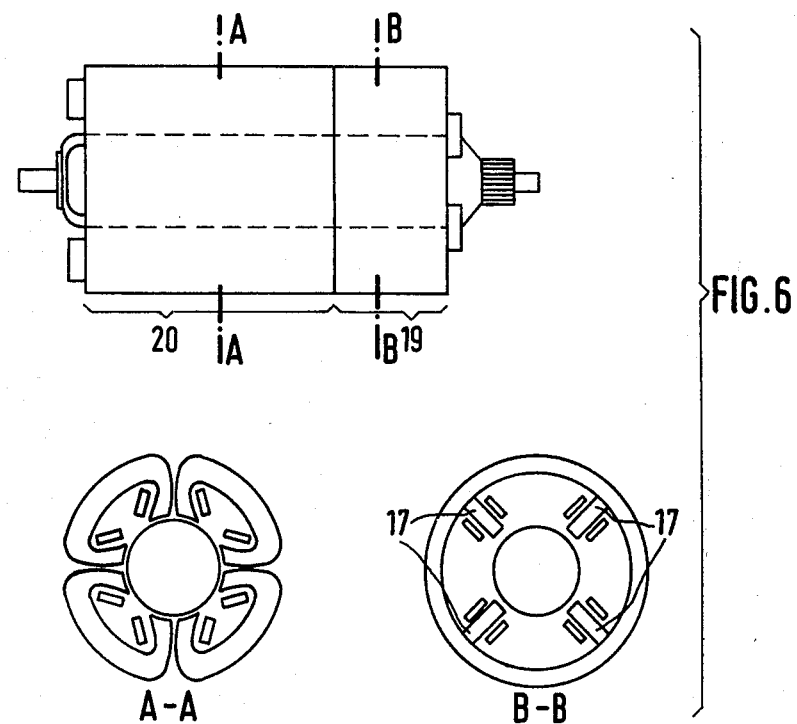
FIG. 6 is a schematic diagram showing an alternate embodiment of field structures with commutating poles in accordance with the present invention.

An alternate embodiment of the commutating pole structure is shown in FIG. 6. Here a commutating pole system 19, which may be of either a solid or a laminated construction, is arranged as an axial extension on one side of the main pole system 20. Specifically, the commutating poles 17 are located in the axial extension of the gaps between two main poles. Alternatively, a commutating pole system 19 could be arranged on both sides of the main pole system 20. Commutating poles arranged opposite one another and having the same polarity are then connected by bars made of magnetic material of high permeability which thus form the pole shoes of commutating poles effective along the whole length of the armature.

Figure 7:
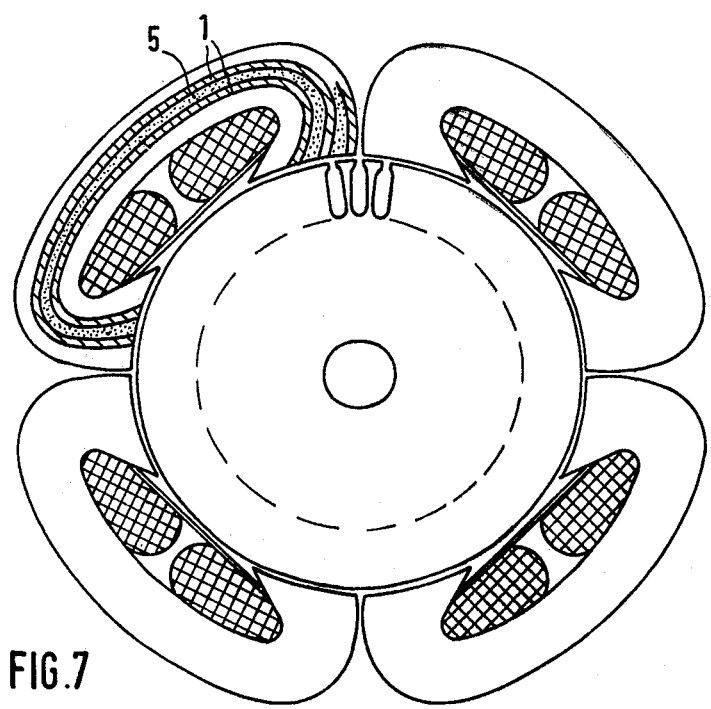
FIG. 7 is a schematic diagram showing a D.C. dynamo without commutating poles.
Figure 8:
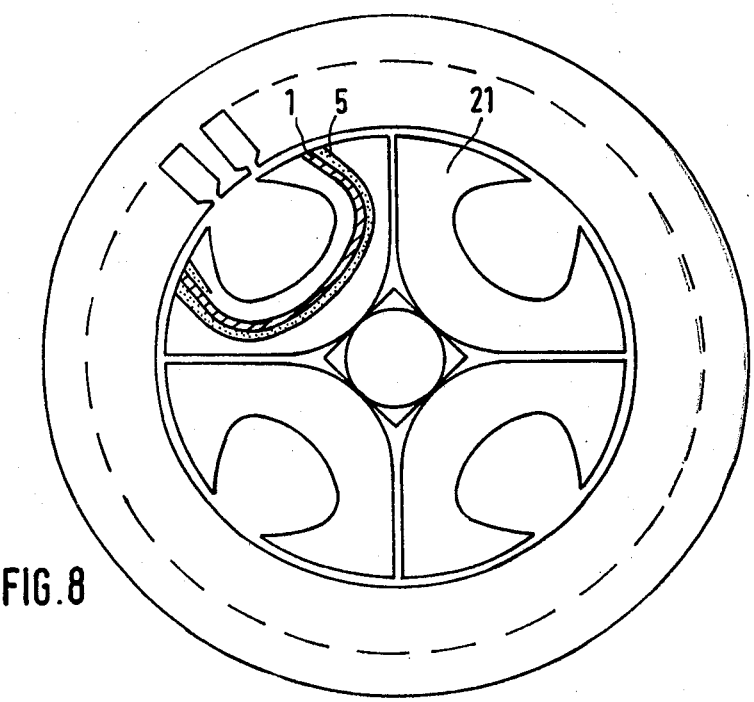
FIG. 8 is a schematic diagram showing an internal pole dynamo with a rotor constructed in accordance with the present invention.

FIG. 7 is a schematic diagram of the construction of a D.C. machine without commutating poles. FIG. 8 shows a synchronous machine and, more specifically, an internal field dynamo, with a rotor 21 constructed in accordance with the present invention. The armature reaction in the transverse axis and therefore the corresponding synchronous reactance is substantially lower than for a conventionally constructed machine.

Figure 9:
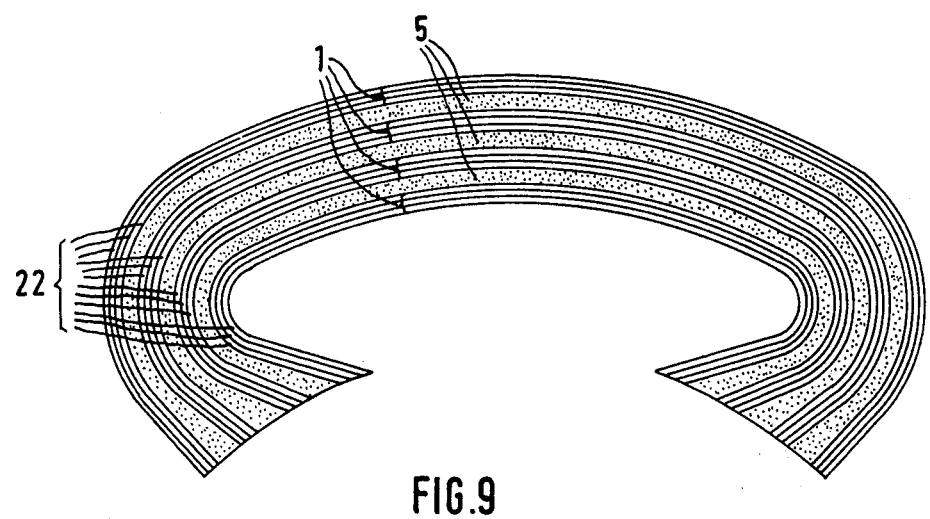
FIG. 9 shows a preferred construction of the lamina of the present invention.

All the above arrangements can be implemented with skewed, as well as with straight rotors and/or stators. The layers of substantially non-magnetic material will have a thickness throughout the entire extent of the yoke 3, that is, between the poles or end portions of the laminae up to and in the same order of magnitude as the thickness of the laminae themselves, as best seen in FIGS. 2 and 9, where the substantially non-magnetic material is illustrated in stippled representation. The specific thickness of the substantially non-magnetic material is subject to variation; to obtain the effect of reduced armature reaction, its thickness must be of the same order of magnitude as the laminae themselves, that is, be substantially thicker than the lacquer or other insulating coating used in dynamo electric machines for electrical insulation only. The term "thickness of the same order of magnitude" thus is intended to mean a substantially greater thickness than that of electrically insulating coatings placed on sheet steel or laminae to prevent eddy currents.

For economic reasons it is desirable to manufacture the exciter structures of the present invention as simply as possible. Certain contradictory requirements arise in that particularly thin lamina are desirable to prevent eddy currents, while for manufacturing reasons it would be desirable to make the lamina as thick as possible without defeating the purpose of the arrangement, namely to decrease the armature reaction.

A solution to this problem is to form composite iron lamina from individual lamina sheets 22 (FIG. 9) which are electrically insulated relative to one another by a thin electrically insulating layer (not shown) and, if required, mechanically connected to one another by adhesive. The number of layers of nonmagnetic or only weakly magnetic material 6 substantially thicker than the insulating layer, which must be interspersed with the composite iron lamina 1 can then be substantially reduced thereby simplifying the manufacture and decreasing the manufacturing costs.

The following data applies to a preferred embodiment:

Number of main poles: 4
Ampere turns of field winding: 150 each pole
Thickness of iron lamina: 0.5 mm
Thickness of nonmagnetic material 5 between lamina: ≧0.2 mm
Width of space 11 between core halves: ≧0.2 mm

We claim:
1. In a dynamo-electric apparatus having an axis of rotation, and an exciter field structure, a field winding (4) on said field structure and generating an excitation field, and an armature (6) generating, in operation, an armature reaction magnetomotive force,
  wherein said exciter field structure comprises
  field poles (2) and yokes (3) connecting the poles, said structure being formed by a plurality of stacked iron lamina (1) arranged parallel to said axis of rotation, and,
  to reduce the effect of the armature reaction, layers of substantially non-magnetic material (5) disposed between sequential ones of said iron lamina which have a thickness throughout the entire extent of the yoke (3) of up to, and in the same order of magnitude as the thickness of the lamina thereof to magnetically separate said sequential ones of said iron lamina from each other by a distance which is up to, and of the same order of magnitude as the thickness of the lamina and to raise the reluctance to magnetic flux of the magnetic path within said exciter field structure to the armature reaction magnetomotive force due to current flow in said armature and to form composite cores;
  whereby the so-separated lamina form composite poles (2) and composite yokes (3), sequential ones of said poles being separated from each other by pole gaps.

2. Apparatus as set forth in claim 1, wherein each of said composite cores has a core root (7); wherein each of said composite cores is split into a first and second core half (10) in the direction of said axis of rotation at said core root; and wherein each of said yokes connects one of said core halves of a selected core to the adjacent core half of a neighboring core.

3. Apparatus as set forth in claim 2, wherein each of said composite cores is split into a first composite core half, and a second composite core half separated from said first core half by a core gap; and wherein the width of said core gap exceeds said distance between said sequential ones of said iron lamina in the region of said core gap.

4. Apparatus as set forth in claim 3, wherein said core gap is an air gap.

5. Apparatus as set forth in claim 3, further comprising substantially nonmagnetic material filling said core gap.

6. Apparatus as set forth in claim 1, wherein said substantially nonmagnetic material is deposited on each of said iron lamina during the manufacture thereof to a thickness creating said at least predetermined minimum distance.

7. Apparatus as set forth in claim 2, wherein each of said core halves comprises a smaller and a larger portion in said direction of said axis of rotation and respectively located away from and extending toward the center of said core; wherein each of said larger portions extends to the corresponding portion of a neighboring core and constitutes a yoke; and wherein said smaller portion extends to the center of the pole gap between said core and said neighboring core, and said smaller portion of said neighboring core extends to said center of said air gap, said two smaller portions at said center of said air gap together constituting a commutating pole.

8. Apparatus as set forth in claim 7, wherein said distance between said sequential ones of said iron lamina in said larger portion is a first predetermined distance, and said distance between said sequential ones of said iron lamina in said smaller portions is a second predetermined distance smaller than said first predetermined distance.

9. Apparatus as set forth in claim 8, wherein said second predetermined distance is zero and said said smaller portion of each of said cores is made of solid material of high magnetic conductivity.

10. Apparatus as set forth in claim 7, further comprising means for mechanically and magnetically coupling said smaller portion of said pole and said smaller portion of said neighboring pole to each other.

11. Apparatus as set forth in claim 7, wherein each of said smaller portions of said cores has a plurality of iron lamina arranged in the direction perpendicular to said axis of rotation.

12. Apparatus as set forth in claim 1, wherein said field winding produces exciter flux in said exciter means; and wherein said iron lamina have a preferred magnetic direction extending in the direction of said exciter flux.

13. Apparatus as set forth in claim 7, wherein flux is created in said smaller portions of said core; and wherein said lamina in said smaller portions of said core have a preferred magnetic direction extending in the direction of said flux.

14. Apparatus as set forth in claim 1, wherein said exciter means comprises a main pole system and a commutator pole system having commutator poles; and wherein said commutator pole system is arranged on one side of said main pole system as an axial extension thereof and positioned in such a manner that said commutating poles are located in the axial extension of said pole gaps.

15. Apparatus as set forth in claim 14, wherein said commutating pole system comprises a first and second commutating system arranged, respectively, on a first and second side of said main pole system as an axial extension thereof; and wherein poles of the same polarity of said first and second commutating pole system are arranged opposite one another in the axial direction of said main pole system, two so arranged poles constituting a pole pair.

16. Apparatus as set forth in claim 15, further comprising connecting means of high permeability for connecting poles forming said pole pairs to each other.

17. Apparatus as set forth in claim 14, wherein said field winding creates a main exciter flux extending in a predetermined direction in said main pole system; and wherein said main pole system comprises a plurality of iron lamina having a magnetically preferred direction extending in the direction of said main exciter flux.

18. Apparatus as set forth in claim 1, wherein said dynamo is a D.C. machine having a commutator.

19. Apparatus as set forth in claim 1, wherein said dynamo is a single phase A.C. machine having a commutator.

20. Apparatus as set forth in claim 1, wherein said dynamo is a synchronous machine.

21. Apparatus as set forth in claim 1, wherein said dynamo comprises a rotor and a stator; and wherein said rotor is skewed.

22. Apparatus as set forth in claim 1, wherein each of said iron lamina comprises a plurality of sub-lamina extending parallel to said axis of rotation.

23. Apparatus as set forth in claim 22, wherein said exciter means comprises a main pole system and a commutating pole system; and wherein said iron lamina of said main pole system and said commutating pole system each comprises a plurality of sub-lamina extending parallel to said axis of rotation.

24. Apparatus as set forth in claim 22, wherein said sub-lamina are electrically insulated relative to one another.

25. Apparatus as set forth in claim 22, further comprising means for mechanically combining said sub-lamina associated with one of said iron lamina to a single mechanical unit.

26. Apparatus as set forth in claim 1, wherein the laminae (1) are of about 0.5 mm thickness, and the non-magnetic material (5) has a thickness of between least 0.2 mm and 0.5 mm.

* * * * *